US010584046B2

(12) United States Patent
Takita (10) Patent No.: US 10,584,046 B2
(45) Date of Patent: Mar. 10, 2020

(54) NITROGEN REMOVAL METHOD, NITRIFICATION-REACTION PROMOTING AGENT FOR WATER TREATMENT, AND WATER TREATMENT METHOD (71) Applicant: KANEKA CORPORATION, Osaka-shi (JP)

(72) Inventor: Masaki Takita, Osaka (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/770,868

(22) PCT Filed: Oct. 7, 2016

(86) PCT No.: PCT/JP2016/080007
§ 371 (c)(1),
(2) Date: Apr. 25, 2018

(87) PCT Pub. No.: WO2017/073304
PCT Pub. Date: May 4, 2017

(65) Prior Publication Data
US 2018/0305233 A1  Oct. 25, 2018

(30) Foreign Application Priority Data
Oct. 28, 2015 (JP) ................ 2015-211586
Oct. 28, 2015 (JP) ................ 2015-211587

(51) Int. Cl.
*C02F 3/30* (2006.01)
*C02F 3/34* (2006.01)
(Continued)

(52) U.S. Cl.
CPC ............ *C02F 3/303* (2013.01); *C02F 3/301* (2013.01); *C02F 3/302* (2013.01); *C02F 3/305* (2013.01);
(Continued)

(58) Field of Classification Search
None
See application file for complete search history.

(56) References Cited

U.S. PATENT DOCUMENTS 5,395,919 A * 3/1995 Lee .................. C08G 63/06
435/135
8,012,352 B1 * 9/2011 Giraldo ............. C02F 3/1268
210/605
(Continued)

FOREIGN PATENT DOCUMENTS

CN     105060615 A    11/2015
JP     2000-153293 A   6/2000
(Continued)

OTHER PUBLICATIONS

Derwent-ACC-No. 2015-75477, Derwent week 201777, Shen Z. et al, Jul. 17, 2015. (Year: 2015).*
(Continued)

*Primary Examiner* — Ana M Fortuna
(74) *Attorney, Agent, or Firm* — Oblon, McClelland, Maier & Neustadt, L.L.P.

(57) ABSTRACT

Disclosed herein is a method for removing nitrogen from water, which makes it possible to omit equipment for controlling the supply of a carbon source (hydrogen donor), equipment for post-processing a carbon source (hydrogen donor), and circulation equipment and to prevent an increase in the size of a system. The method includes adding a solid material containing a biodegradable resin as a hydrogen donor to one water system in which bacteria cells having an ability to decompose a biodegradable resin, bacteria cells having nitrification capabilities, and bacteria cells having denitrification capabilities live together to allow a nitrification reaction and a denitrification reaction coexist in the water system. Also disclosed herein is a nitrification-reaction promoting agent for water treatment including 20 wt %

(Continued)

or more of a biodegradable resin and having a specific gravity of more than 1 g/cm$^3$.

12 Claims, 3 Drawing Sheets

(51) Int. Cl.
    *C08G 63/00* (2006.01)
    *C08G 63/08* (2006.01)
    *C08G 63/16* (2006.01)
    *C08L 67/04* (2006.01)
    *C08L 101/16* (2006.01)

(52) U.S. Cl.
    CPC ............... *C02F 3/348* (2013.01); *C08G 63/00* (2013.01); *C08G 63/08* (2013.01); *C08G 63/16* (2013.01); *C08L 67/04* (2013.01); *C08L 101/16* (2013.01)

(56) References Cited

U.S. PATENT DOCUMENTS

| | | | |
|---|---|---|---|
| 2011/0107660 A1* | 5/2011 | Chen | C10L 1/02 44/400 |
| 2016/0251247 A1* | 9/2016 | Chen | C02F 3/308 210/605 |
| 2016/0272519 A1* | 9/2016 | Ledwell | C02F 3/006 |
| 2017/0210654 A1* | 7/2017 | Yang | C02F 3/327 |

FOREIGN PATENT DOCUMENTS

| | | |
|---|---|---|
| JP | 2004-105802 A | 4/2004 |
| JP | 2006-247624 A | 9/2006 |
| JP | 2014-132831 A | 7/2014 |

OTHER PUBLICATIONS

International Search Report dated Dec. 20, 2016, in PCT/JP2016/080007 filed Oct. 7, 2016.
Watanabe, A. et al., "Development of biological wastewater treatment system for nitrogen removal part 10.—Improvement and stabilization of nitrogen-removal activity of bioreactor using poly(lactic acid) as energy source—", CRIEPI Research Report, V04027, (2005), 19 pages.
Yoshikura. T. et al., "Advanced water treatment technology with biological nitrification and denitrification". Journal of Urban Living and Health Association. vol. 43, No. 2, (1999), pp. 49-64 ( with English Abstract).
Claros, J. et al., "Effect of pH and HNO2 concentration on the activity of ammonia-oxidizing bacteria in a partial nitritation reactor", Water Science 7 Technology, vol. 67, No. 11, (2013), pp. 2587-2594.
Extended European Search Report dated Apr. 26, 2019 in Patent Application No. 16859541.1, 9 pages.
Wu, W. et al., "Denitrification performance and microbial diversity in a packed-bed bioreactor using PCL as carbon source and biofilm carrier", Applied Microbiology and Biotechnology, XP055581924, vol. 97, No. 6, May 5, 2012, pp. 2725-2733.
Mergaert, J. et al., "Identity and Potential Functions of Heterotrophic Bacterial Isolates from a Continuous-Upflow Fixed-Bed Reactor for Denitrification of Drinking Water with Bacterial Polyester as Source of Carbon and Electron Donor", Systematic and Applied Microbiology, XP004957305, vol. 24, No. 2, May 25, 2001, pp. 303-310.
Wu, W. et al., "Denitrification using PBS as carbon source and biofilm support in a packed-bed bioreactor", Environmental Science and Pollution Research, XP035158929, vol. 20, No. 1, May 5, 2012, pp. 333-339.
Hiraishi, A. et al., "Application of polyhydroxyalkanoates for denitrification in water and wastewater treatment", Applied Microbiology and Biotechnology, XP055581998, vol. 61, No. 2, Jan. 14, 2003, pp. 103-109.

\* cited by examiner

NITROGEN REMOVAL METHOD, NITRIFICATION-REACTION PROMOTING AGENT FOR WATER TREATMENT, AND WATER TREATMENT METHOD

TECHNICAL FIELD

The present invention relates to a method for removing nitrogen from contaminated water containing nitrogen, a nitrification-reaction promoting agent for water treatment, and a water treatment method.

BACKGROUND ART

In order to realize harmony between human activities and the environment, it is necessary to reduce contaminants generated by human activities as much as possible and to treat generated contaminants to make them harmless. Therefore, industrial water or the like is conventionally treated by oxidizing ammonium nitrogen contained therein to nitrite nitrogen/nitrate nitrogen by an aerobic biological nitrification process and then reducing it to nitrogen gas by an anaerobic denitrification process. Nitrification (oxidation reaction) and denitrification (reduction reaction) are opposite reactions, and therefore it is usually difficult to perform both these reaction in one reactor.

For this reason, a reactor is generally separated into two tanks, a nitrification tank and a denitrification tank, to sequentially treat water in these tanks (Non-Patent Literature 1). For example, when the nitrification tank (aerobic treatment tank) and the denitrification tank (anaerobic treatment tank) are arranged in this order, the reactor has a high ability to remove nitrogen from water so that the quality of final treated water is improved. However, it is necessary to add a carbon source (hydrogen donor), such as methanol, required for denitrification. The amount of the carbon source (hydrogen donor) required for denitrification is determined on the basis of the amount of nitrogen contained in water, and therefore the supply of the carbon source (hydrogen donor) needs to be strictly controlled. From an industrial viewpoint, an excessive amount of the carbon source (hydrogen donor) is added to perform denitrification. Therefore, equipment for finally treating the excess carbon source (hydrogen donor) is often provided.

As a method that makes it possible to omit equipment for controlling the supply of a carbon source (hydrogen donor) or equipment for post-treating a carbon source (hydrogen donor), a method is known in which a denitrification tank (anaerobic treatment tank) and a nitrification tank (aerobic treatment tank) are arranged in this order to cyclically return a nitrified liquor obtained in the latter part to the denitrification tank (anaerobic treatment tank) of the former part to make it easy to control the supply of a carbon source (hydrogen donor) (Non-Patent Literature 1), or a method is known in which a biodegradable plastic is provided as a carbon source (hydrogen donor) in an anaerobic treatment tank and/or an aerobic treatment tank (Patent Literature 1). However, these methods have problems that circulation equipment is required, the sizes of tanks are increased to provide residence time, and the quality of final treated water is lower than that of water treated first in a nitrification tank and then in a denitrification tank.

Further, nitrite nitrogen ($N-NO_2$) generated by nitrification inhibits nitrification. Therefore, when nitrite nitrogen is accumulated in a system, a nitrification rate is reduced so that nitrification does not sufficiently proceed (see Non-Patent Literature 2).

In order to avoid this, a method has been proposed in which water to be treated is previously diluted before water treatment to reduce the concentration of ammonium nitrogen in the water to be treated. However, this method has a problem that when wastewater having a high ammonium nitrogen concentration is treated, the volume of water to be treated is increased so that the sizes of tanks are increased and therefore the cost of equipment is increased.

On the other hand, an ammonia stripping method is known as a physicochemical treatment method. This method can be performed more stably than a biological treatment method, but has problems that the cost of energy is high due to the use of steam and addition of an alkaline agent is absolutely necessary to make water to be treated alkaline.

CITATION LIST

Patent Literature

PTL 1: JP 2000-153293 A

Non-Patent Literature

Non-PTL 1: Journal of Urban Living and Health Association, Vol 43, No. 2, 1999, pp. 49-64

Non-PLT 2: Water Science & Technology, Vol 67, No 11, pp 2587-2594

SUMMARY OF INVENTION

Technical Problem

A first object of the present invention is to provide a method for removing nitrogen from water, which makes it possible to omit equipment for controlling the supply of a carbon source (hydrogen donor), equipment for post-treating a carbon source (hydrogen donor), and circulation equipment and to prevent an increase in the size of a system.

A second object of the present invention is to provide a nitrification-reaction promoting agent for water treatment that makes it possible to simply and inexpensively apply biological water treatment to water to be treated containing a high concentration of ammonium nitrogen without diluting the water, and a water treatment method using the promoting agent.

Solution to Problem

In order to achieve the above objects, the present inventors have intensively studied and as a result found that a nitrification reaction and a denitrification reaction, which are difficult to coexist under normal conditions, are allowed to coexist in one tank by adding a hydrogen donor containing a biodegradable resin to a water system in which bacteria cells having an ability to decompose a biodegradable resin, bacteria cells having nitrification capabilities, and bacteria cells having denitrification capabilities live together, which makes it possible to improve the quality of final treated water and achieve both a reduction in the cost of equipment and advanced water treatment which have been hitherto difficult to achieve at the same time. This finding has led to the completion of a first aspect of the present invention.

Further, the present inventors have found that, even when water to be treated contains a high concentration of ammonium nitrogen, nitrification of ammonium nitrogen can be promoted by adding a material containing a certain amount of biodegradable resin and having a certain specific gravity to the water containing ammonium nitrogen so that the water containing a high concentration of ammonium nitrogen can be biologically treated without diluting the water to be treated, that is, without increasing the capacity of a treatment tank. This finding has led to the completion of a second aspect of the present invention.

More specifically, the first aspect of the present invention relates to the following (1) to (7).

(1) A nitrogen removal method comprising adding a solid material containing a biodegradable resin as a hydrogen donor to one water system in which bacteria cells having an ability to decompose a biodegradable resin, bacteria cells having nitrification capabilities, and bacteria cells having denitrification capabilities live together to allow a nitrification reaction and a denitrification reaction to coexist in the water system.

(2) The nitrogen removal method as described above, wherein the water system has a dissolved oxygen concentration of at least 1.5 ppm.

(3) The nitrogen removal method as described above, wherein the biodegradable resin is a biodegradable polyester.

(4) The nitrogen removal method as described above, wherein the biodegradable polyester is a biodegradable aliphatic polyester.

(5) The nitrogen removal method as described above, wherein the biodegradable aliphatic polyester is a poly-3-hydroxyalkanoate.

(6) The nitrogen removal method as described above, wherein the poly-3-hydroxyalkanoate is a poly-3-hydroxybutyrate homopolymer or copolymer.

(7) The nitrogen removal method as described above, wherein the water system has a ratio (weight ratio) of an amount of dissolved carbon to an amount of dissolved nitrogen of 10 or less.

The second aspect of the present invention relates to the following (8) to (12).

(8) A nitrification-reaction promoting agent for water treatment comprising 20 wt % or more of a biodegradable resin and having a specific gravity of more than 1 g/cm$^3$.

(9) The nitrification-reaction promoting agent for water treatment as described above, wherein the biodegradable resin is at least one selected from the group consisting of a poly-3-hydroxyalkanoate, polybutylene succinate, and polylactic acid.

(10) A water treatment method comprising adding the nitrification-reaction promoting agent for water treatment to a water system in which bacteria cells having an ability to decompose a biodegradable resin, bacteria cells having nitrification capabilities, and bacteria cells having denitrification capabilities live together.

(11) The water treatment method as described above, wherein the water system has a dissolved oxygen concentration of 1.5 ppm or more. (12) The water treatment method as described above, wherein the water system has a ratio (weight ratio) of an amount of dissolved carbon and an amount of dissolved nitrogen of 10 or less.

Advantageous Effects of Invention

According to the first aspect of the present invention, it is possible to provide a method for removing nitrogen from water, which makes it possible to omit equipment for controlling the supply of a carbon source (hydrogen donor) and equipment for post-treating a carbon source (hydrogen donor) which have hitherto been required to remove nitrogen using a nitrification tank and a denitrification tank arranged in this order, and circulation equipment which has hitherto been required to remove nitrogen using a denitrification tank and a nitrification tank arranged in this order, and to prevent an increase in the size of a system. According to the first aspect of the present invention, it is possible to allow a nitrification reaction and a denitrification reaction to coexist in one tank. This makes it possible to improve the quality of final treated water and to achieve both a reduction in the cost of equipment and advanced water treatment that have hitherto been difficult to achieve at the same time.

According to the second aspect of the present invention, it is possible to promote a nitrification reaction in the biological treatment of water containing ammonium nitrogen, and particularly it is also possible to promote a nitrification reaction in water containing a high concentration of ammonium nitrogen. This eliminates the need for previously diluting water to be treated. Therefore, it is possible to simply and inexpensively perform biological treatment. Further, it is possible to allow a subsequent denitrification reaction as well as a nitrification reaction to rapidly proceed, that is, it is possible to allow a nitrification reaction and a denitrification reaction to coexist in one system. This makes it possible to efficiently convert ammonium nitrogen into nitrogen gas.

DESCRIPTION OF EMBODIMENTS

Hereinafter, the present invention will be described in more detail.

(First Aspect of Invention)

A nitrogen removal method according to a first aspect of the present invention comprises adding a solid material containing a biodegradable resin as a hydrogen donor to one water system in which bacteria cells having an ability to decompose a biodegradable resin, bacteria cells having nitrification capabilities, and bacteria cells having denitrification capabilities live together.

In the present invention, a water system containing ammonium nitrogen can be used as a water system to be treated. Any water system containing ammonium nitrogen can be appropriately used as long as it has substantially no adverse effect on microorganisms. The composition of the water system is not particularly limited, but the ratio (weight ratio) of the amount of dissolved carbon to the amount of dissolved nitrogen of the water system is preferably 10 or less, more preferably 5 or less, even more preferably 1 or less. When the ratio exceeds 10, there is a case where the uptake of ammonium nitrogen by bacteria cells preferentially occurs so that a nitrification reaction does not sufficiently proceed.

The amount of dissolved carbon is effectively measured by, for example, using a combustion oxidation method for measuring the amount of carbon. As a measuring device used for such a method, for example, TOC-150 manufactured by Toray Engineering Co., Ltd. can be used. On the other hand, the amount of dissolved nitrogen can be effectively measured by, for example, using a measuring method based on a method specified in JIS K 0102.45.2. Alternatively, the amount of dissolved carbon or the amount of dissolved nitrogen may be measured by a simple method using a reagent manufactured by HACH.

The water system to be used in the present invention preferably contains 50 mg/L or more of ammonium nitrogen to obtain advantageous effects of the present invention. Addition of a hydrogen donor containing a biodegradable resin to such a water system makes it possible to allow a nitrification reaction and a denitrification reaction to coexist in one water system. Further, since a denitrification reaction proceeds, the accumulation of nitrite nitrogen that inhibits nitrification is reduced, which as a result makes it possible to promote a nitrification reaction. Therefore, unlike the methods disclosed in Non-Patent Literature 1 and Patent Literature 1, ammonium nitrogen can be changed to nitrogen gas in one tank without using an anaerobic treatment tank and an aerobic treatment tank in combination.

The biodegradable resin to be used in the present invention may be any biodegradable resin having biodegradability, but is preferably a biodegradable polyester, more preferably a biodegradable aliphatic polyester. Examples of the biodegradable aliphatic polyester include a polyhydroxyalkanoate (hereinafter abbreviated as PHA) and a polyalkylene dicarboxylate. An example of a biodegradable polyester other than the biodegradable aliphatic polyester is polybutyleneadipate-co-terephthalate. Only one biodegradable resin may be used, or two or more biodegradable resins may be used in combination.

The PHA refers to a polyester having hydroxyalkanoic acid as a monomer unit. Specific examples of the PHA include polyglycolic acid, polylactic acid (hereinafter abbreviated as PLA), a poly-3-hydroxyalkanoate (hereinafter abbreviated as P3HA), and a poly-4-hydroxyalkanoate. Among them, PLA and P3HA are preferred, and P3HA is more preferred because a high nitrogen removal rate is achieved.

The polyalkylene dicarboxylate refers to a polycondensate of an aliphatic diol (or a derivative thereof) and an aliphatic dicarboxylic acid (or a derivative thereof). Specific examples of the polyalkylene dicarboxylate include polybutylene succinate (hereinafter abbreviated as PBS), polyethylene succinate, and poly(butylenesuccinate-co-butyleneadipate).

The P3HA refers to a polymer having a 3-hydroxyalkanoic acid as a main monomer unit. The 3-hydroxyalkanoic acid is not particularly limited, and examples thereof include 3-hydroxybutyrate, 3-hydroxypropionate, 3-hydroxyvalerate, 3-hydroxyhexanoate, 3-hydroxyheptanoate, and 3-hydroxyoctanoate. These polymers may be homopolymers or copolymers containing two or more kinds of monomer units. When the P3HA is a copolymer, two or more kinds of 3-hydoxyalkanoic acids may be copolymerized, one or two or more kinds of 3-hydroxyalkanoic acids and a 4-hydroxyalkanoic acid such as 4-hydroxybutyrate may be copolymerized. Specific examples of the P3HA include a poly-3-hydroxybutyrate homopolymer and poly-3-hydroxybutyrate copolymers such as poly-3-hydroxybutyrate-co-3-hydroxyhexanoate (PHBH), poly-3-hydroxybutyrate-co-3-hydroxyvalerate (PHBV), and poly-3-hydroxybutyrate-co-4-hydroxybutyrate. When the P3HA is used, only one kind of P3HA may be used, or two or more kinds of P3HAs may be used in combination.

From the viewpoint of nitrogen removal rate, the biodegradable resin to be used in the present invention is preferably P3HA, PBS, or PLA, more preferably P3HA or PBS, particularly preferably P3HA.

The solid material containing a biodegradable resin to be used in the first aspect of the present invention may be a solid material consisting essentially of only a biodegradable resin or a solid material containing another hydrogen donor in addition to a biodegradable resin. The another hydrogen donor is not particularly limited, but may be, for example, starch. The solid material containing a biodegradable resin may further contain a non-biodegradable resin such as polyethylene or polypropylene, a solid fat, or a wood powder.

In order to carry out the first aspect of the present invention, it is necessary to add the solid material containing a biodegradable resin to one water system in which bacteria cells having an ability to decompose a biodegradable resin, bacteria cells having nitrification capabilities, and bacteria cells having denitrification capabilities live together. As the bacteria cells involved in the present invention, microorganisms that live in the natural environment may be used. However, in order to increase the efficiency of nitrogen removal, a water system in which microorganisms involved in the present invention are concentrated is preferably used. For example, when the nitrogen removal method according to the present invention is applied to wastewater treatment, the solid material containing a biodegradable resin is preferably added to a conventional activated sludge treatment tank (aeration tank). The above-described microorganisms are concentrated in conventional activated sludge, and therefore the present invention can be properly carried out by adding the solid material containing a biodegradable resin to an activated sludge treatment tank (aeration tank). Further, the present invention can be properly carried out also by adding activated sludge collected from the activated sludge treatment tank to a water system to be treated and further adding the solid material containing a biodegradable resin to the water system to be treated.

According to the first aspect of the present invention, addition of the solid material containing a biodegradable resin to one water system in which bacteria cells having an ability to decompose a biodegradable resin, bacteria cells having nitrification capabilities, and bacteria cells having denitrification capabilities live together makes it possible to cause both a nitrification reaction and a denitrification reaction in the one water system without separately providing an anaerobic treatment tank and an aerobic treatment tank.

When nitrogen is removed according to the present invention, a water system to be treated is preferably kept in a state where oxygen is dissolved therein. Therefore, it is preferred that oxygen is supplied to the water system, and it is more preferred that the concentration of dissolved oxygen in the water system is kept at a certain level or higher. From the viewpoint of nitrogen removal rate, the concentration of dissolved oxygen in the water system is preferably 1.5 ppm or more, more preferably 2 ppm or more. The upper limit of the concentration of dissolved oxygen is not particularly limited. However, since oxygen is forcibly supplied, the upper limit of the concentration of dissolved oxygen is kept to the minimum from the viewpoint of cost. More specifically, the upper limit of the concentration of dissolved oxygen is preferably 4 ppm or less, more preferably 2.5 ppm or less. When oxygen is supplied, the amount of oxygen to be supplied is preferably controlled by on-line monitoring. As a method for forcibly supplying oxygen, any method conceivable by those skilled in the art is appropriately used. For example, an oxygen supply system for use in conventional activated sludge treatment can be appropriately used, and air or pure oxygen may be used to supply oxygen to the water system.

As described above, the present invention is preferably carried out under aerobic conditions, and a denitrification reaction that is a reduction reaction efficiently proceeds even under aerobic conditions. The reason why a denitrification reaction efficiently proceeds even under aerobic conditions is considered to be that the biodegradable resin is decomposed by bacteria cells having an ability to decompose a biodegradable resin so that anaerobic conditions are locally created in areas around the resin and the resin acts as a hydrogen donor on bacteria cells having denitrification capabilities.

The temperature of the water system at the time when the present invention is carried out is not particularly limited. However, the water system preferably has a temperature suitable for the growth of microorganisms involved in the present invention. The lower limit of the range of optimum temperature is generally preferably 10 degrees centigrade or higher, more preferably 15 degrees centigrade or higher, even more preferably 20 degrees centigrade or higher, and the upper limit of the range of optimum temperature is preferably 60 degrees centigrade or lower, more preferably 55 degrees centigrade or lower, even more preferably 50 degrees centigrade or lower. However, the upper and lower limits are not limited thereto because they depend on microorganisms involved in the present invention. Further, a nitrification reaction and a denitrification reaction have high temperature dependence, and therefore the present invention is preferably carried out while the temperature of the water system is controlled to achieve an optimum temperature.

The pH of the water system at the time when the present invention is carried out is not particularly limited. However, similarly to temperature, the water system preferably has a pH suitable for the growth of microorganisms involved in the present invention. The lower limit of the range of optimum pH is generally preferably 3 or higher, more preferably 4 or higher, even more preferably 5 or higher, and the upper limit of the range of optimum pH is preferably 10 or lower, more preferably 9 or lower, even more preferably 8 or lower. However, the lower and upper limits are not limited thereto because they depend on microorganisms involved in the present invention. Further, a nitrification reaction and a denitrification reaction have high pH dependence, and therefore the present invention is preferably carried out while the pH of the water system is controlled to achieve an optimum pH. It is to be noted that a reagent for use in adjusting pH is not particularly limited, and a reagent conceivable by those skilled in the art, such as sodium hydroxide or sulfuric acid, can be appropriately used.

(Second Aspect of Invention)

A nitrification-reaction promoting agent for water treatment according to a second aspect of the present invention is added to water containing ammonium nitrogen when the water is biologically treated so that a nitrification reaction performed by microorganisms to oxidize ammonium nitrogen to nitrite nitrogen/nitrate nitrogen can be promoted. The nitrification reaction is inhibited by nitrite nitrogen that is one of products, and therefore there has been a problem that a nitrification rate is reduced as the nitrification reaction proceeds. This problem is particularly remarkable when water containing a high concentration of ammonium nitrogen is treated. However, the nitrification-reaction promoting agent for water treatment according to the second aspect of the present invention can promote a nitrification reaction even when water contains a high concentration of ammonium nitrogen, and therefore can be appropriately used as a nitrification-reaction promoting agent for use in treating water containing a high concentration of ammonium nitrogen.

Further, the nitrification-reaction promoting agent for water treatment according to the second aspect of the present invention contains a biodegradable resin. The biodegradable resin is decomposed by bacteria cells having an ability to decompose a biodegradable resin during biological treatment so that anaerobic conditions are locally created in areas around the resin and the resin acts as a hydrogen donor, which makes it possible to promote a denitrification reaction. Therefore, it is considered that accumulation of nitrite nitrogen that inhibits a nitrification reaction can be prevented, and therefore a nitrification reaction can be promoted. As a result, both a nitrification reaction and a denitrification reaction rapidly proceed almost at the same time. Therefore, the nitrification-reaction promoting agent according to the present invention can be used as a nitrification-reaction promoting agent for use in water treatment in which a nitrification reaction and a denitrification reaction are performed in one water system.

The form of the nitrification-reaction promoting agent for water treatment according to the second aspect of the present invention is not particularly limited. However, from the viewpoint of increasing the contact surface with microorganisms involved in the reactions, the nitrification-reaction promoting agent is preferably in the form of powder, granules, pellets, or the like.

The nitrification-reaction promoting agent for water treatment according to the second aspect of the present invention can be used for treatment of wastewater discharged from factories or homes, water contaminated with the residue of feed for cultivation of aquatic organisms or growth of aquarium fish, groundwater contaminated with fertilizers for agriculture, etc.

The amount of the biodegradable resin contained in the nitrification-reaction promoting agent for water treatment according to the second aspect of the present invention is preferably 20 wt % or more, more preferably 30 wt % or more, even more preferably 40 wt % or more. If the content of the biodegradable resin is less than 20 wt %, there is a case where components other than the biodegradable resin have adverse effects on microorganisms involved in the reactions or remain as suspended matter that reduces the quality of treated water. The upper limit of the content of the biodegradable resin may be 100 wt % as long as a desired specific gravity of the nitrification-reaction promoting agent is satisfied.

The biodegradable resin may be the same as the biodegradable resin described above with reference to the first aspect of the present invention. The biodegradable resin is more preferably P3HA, PBS, or PLA, even more preferably P3HA or PBS, particularly preferably P3HA because a high nitrification rate is achieved.

The nitrification-reaction promoting agent for water treatment may contain a material other than the biodegradable resin in an amount of less than 80 wt %. Specific examples of such a material include starch, a non-biodegradable resin such as polyethylene or polypropylene, a solid fat, and a wood powder. By adding these materials, it is possible to adjust the specific gravity of the nitrification-reaction promoting agent for water treatment.

The specific gravity of the nitrification-reaction promoting agent for water treatment is preferably more than 1 g/cm$^3$, more preferably 1.1 g/cm$^3$ or more, even more preferably 1.2 g/cm$^3$ or more. If the specific gravity is 1 g/cm$^3$ or less, there is a case where the nitrification-reaction promoting agent for water treatment floats on water so that reaction efficiency is reduced due to poor contact with microorganisms involved in the reactions. Further, the nitrification-reaction promoting agent is preferably dispersed to some extent in water to be treated when the water is stirred by aeration. Therefore, the specific gravity of the nitrification-reaction promoting agent for water treatment according to the present invention is preferably 3 g/cm$^3$ or less, more preferably 2.5 g/cm$^3$ or less, even more preferably 2 g/cm$^3$ or less. If the specific gravity exceeds 3 g/cm$^3$, there is a case where the nitrification-reaction promoting agent sinks in water so that reaction efficiency is reduced due to poor contact with microorganisms involved in the reactions.

It is preferred that a water system to be treated according to the present invention contains 50 mg/L or more of ammonium nitrogen, and further contains bacteria cells (bacteria cells that oxidize BOD (organic matter)) having an ability to decompose a biodegradable resin and bacteria cells having nitrification capabilities, and bacteria cells having denitrification capabilities. When the nitrification-reaction promoting agent for water treatment is added to such a water system, a nitrification reaction is allowed to promote, and a nitrification reaction and a denitrification reaction are allowed to coexist in one system, and therefore it is not necessary to use an anaerobic treatment tank and an aerobic treatment tank in combination, and ammonium nitrogen can be changed to nitrogen gas in one system.

When applied to wastewater treatment, the nitrification-reaction promoting agent for water treatment according to the present invention is preferably added to an activated sludge treatment tank (aeration tank), and is more preferably added to a nitrification reaction tank.

Similarly to the first aspect of the present invention, the ratio (weight ratio) of the amount of dissolved carbon to the amount of dissolved nitrogen of a water system to be treated according to the second aspect of the present invention is preferably 10 or less, more preferably 5 or less, even more preferably 1 or less.

When water treatment is performed using the nitrification-reaction promoting agent according to the second aspect of the present invention, similarly to the first aspect of the present invention, oxygen is preferably dissolved in a water system to be treated. From the viewpoint of promoting a nitrification reaction, the concentration of dissolved oxygen in the water system is preferably 1.5 ppm or more, more preferably 2 ppm or more. The upper limit of the concentration of dissolved oxygen is not particularly limited, but is preferably 4 ppm or less, more preferably 2.5 ppm or less.

The temperature and pH of a water system to be treated according to the second aspect of the present invention are the same as those descried above with reference to the first aspect of the present invention.

EXAMPLES

The present invention will be more specifically described with reference to the following examples, but the present invention is not limited to these examples. It is to be noted that "%" used in the examples is by weight.

Example 1

Examination of Nitrogen Removal Rate using PHBH Granules

First, 1 mM of citric acid, 2 mM of potassium dihydrogen phosphate, 0.5 mM of magnesium sulfate heptahydrate, 20 mM of sodium chloride, 0.02 mM of calcium chloride dihydrate, 0.01 mM of zinc sulfate heptahydrate, 0.03 mM of iron sulfate (II) heptahydrate, 0.01 mM of copper sulfate pentahydrate, 5 mg/L of EDTA, and 20 mM of ammonium chloride were dissolved in distilled water to obtain a solution. The solution was adjusted to pH 8.5 by adding a 30% sodium hydroxide solution to obtain simulated wastewater. The simulated wastewater was used in the following experiment. The ratio (weight ratio) of the amount of dissolved carbon to the amount of dissolved nitrogen of the simulated wastewater was 0.25.

Then, sludges collected from an aeration tank, a nitrification tank, and a denitrification tank of a comprehensive wastewater treatment system in the plant of KANEKA CORPORATION were mixed, the sludge mixture was centrifuged at 3000 G for 10 minutes, and precipitated sludge was separated by discarding supernatant. This precipitated sludge was mixed with and suspended in the same amount of distilled water as the discarded supernatant to obtain suspended sludge. The suspended sludge was again centrifuged at 3000 G for 10 minutes, and supernatant was again discarded to obtain washed sludge. The washed sludge was mixed with and suspended in the simulated wastewater prepared above to obtain a sludge suspension having the same concentration as the original sludge mixture. The concentration of ammonium nitrogen contained in the supernatant of the sludge suspension was measured and found to be 280 mg/L.

Then, 3% of PHBH granules (purity: 99 wt % or more, specific gravity: 1.1 g/cm$^3$) were added to the sludge suspension, and the sludge suspension was aerated at 30±2° C. At this time, the aeration was performed while the pH of the sludge suspension was adjusted to 8 to 8.5 with the use of a 30% sodium hydroxide solution, and an air flow rate was adjusted so that the concentration of dissolved oxygen (DO) in the sludge suspension was 5 ppm or more.

Figure 1:
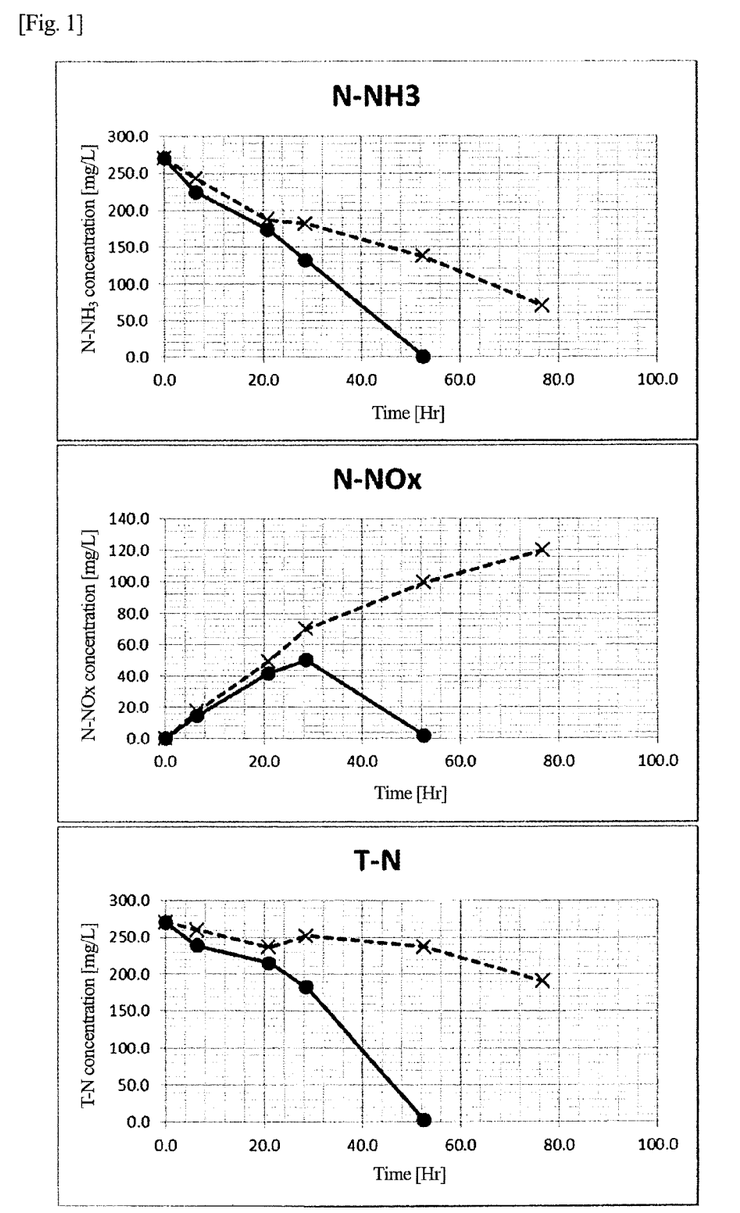
FIG. 1 includes graphs showing temporal changes in the concentration of ammonium nitrogen (N—NH$_3$), the sum of the concentration of nitrite nitrogen and the concentration of nitrate nitrogen (N—NO$_x$), and the concentration of total nitrogen (T-N) in a system of Example 1 and a system of Comparative Example 1.

After a lapse of a predetermined time from the start of aeration, a sample was collected from the sludge suspension and centrifuged at 9000 G for 10 minutes to obtain supernatant. The concentrations of ammonium nitrogen, nitrite nitrogen, and nitrate nitrogen in the supernatant were measured. It is to be noted that the concentrations of ammonium nitrogen, nitrite nitrogen, and nitrate nitrogen were measured using DR6000 and corresponding reagents (TNT832, TNT835, TNT840) manufactured by HACH. The results are shown by solid lines in FIG. 1. In FIG. 1, N—NH$_3$ represents the concentration of ammonium nitrogen, N—NOx represents the sum of the concentration of nitrite nitrogen (N—NO$_2$) and the concentration of nitrate nitrogen (N—NO$_3$), and T-N (total nitrogen) represents the sum of the concentration of ammonium nitrogen, the concentration of nitrite nitrogen, and the concentration of nitrate nitrogen.

Figure 2:
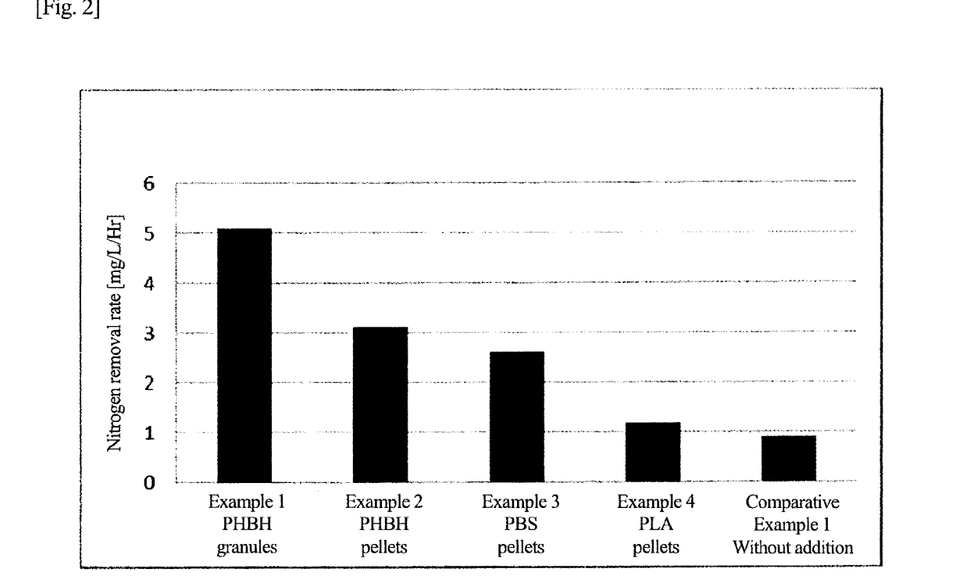
FIG. 2 is a graph showing the nitrogen removal rates of systems of Examples 1 to 4 and Comparative Example 1.

Further, a nitrogen removal rate was calculated from a temporal change in T-N (total nitrogen). The obtained result is shown in FIG. 2.

The above results revealed that addition of the PHBH granules made it possible to allow a nitrification reaction and a denitrification reaction to occur at the same time, achieve a high nitrogen removal rate, significantly reduce the concentration of nitrogen in the system with time, and efficiently remove nitrogen from the system.

Example 2

Examination of Nitrogen Removal Rate using PHBH Pellets

In accordance with the description in Example 1, a sludge suspension using the simulated wastewater was prepared. PHBH pellets (purity: 99 wt % or more, specific gravity: 1.2 g/cm$^3$) were added instead of the PHBH granules to the sludge suspension, and the sludge suspension was aerated while the concentrations of ammonium nitrogen, nitrite nitrogen, and nitrate nitrogen were measured with time. The other experimental conditions and analytical conditions were the same as those in the method described in Example 1. A nitrogen removal rate was calculated from a measured temporal change in T-N (total nitrogen), and the obtained result is shown in FIG. 2.

This result revealed that a high nitrogen removal rate was achieved even by using the PHBH pellets and nitrogen could be efficiently removed from the system.

Example 3

Examination of Nitrogen Removal Rate using PBS Pellets

In accordance with the description in Example 1, a sludge suspension using the simulated wastewater was prepared. PBS pellets (purity: 99 wt % or more, specific gravity: 1.1 g/cm$^3$) were added instead of the PHBH granules to the sludge suspension, and the sludge suspension was aerated while the concentrations of ammonium nitrogen, nitrite nitrogen, and nitrate nitrogen were measured with time. The other experimental conditions and analytical conditions were the same as those in the method described in Example 1. A nitrogen removal rate was calculated from a measured temporal change in T-N (total nitrogen), and the obtained result is shown in FIG. 2.

This result revealed that a high nitrogen removal rate was achieved even by using the PBS pellets, and nitrogen could be efficiently removed from the system.

Example 4

Examination of Nitrogen Removal Rate using PLA Pellets

In accordance with the description in Example 1, a sludge suspension using the simulated wastewater was prepared. Then, PLA pellets (purity: 99 wt % or more, specific gravity: 1.1 g/cm$^3$) were added instead of the PHBH granules to the sludge suspension, and the sludge suspension was aerated while the concentrations of ammonium nitrogen, nitrite nitrogen, and nitrate nitrogen were measured with time. The other experimental conditions and analytical conditions were the same as those in the method described in Example 1. A nitrogen removal rate was calculated from a measured temporal change in T-N (total nitrogen), and the obtained result is shown in FIG. 2.

This result revealed that a high nitrogen removal rate was achieved even by using the PLA pellets, and nitrogen could be efficiently removed from the system.

Example 5

Effect of Dissolved Oxygen Concentration (DO) on Nitrogen Removal Rate

According to the description in Example 1, a sludge suspension using the simulated wastewater was prepared. Then, 3% of PHBH granules were added to the sludge suspension, and the sludge suspension was aerated at 30±2° C. At this time, the aeration was performed while the pH of the sludge suspension was adjusted to 8 to 8.5 with the use of a 30% sodium hydroxide solution, and an air flow rate was adjusted so that the concentration of dissolved oxygen (DO) in the sludge suspension was 0 ppm, 0.8 ppm, 1.8 ppm, 4 ppm, 5.5 ppm, or 6.5 ppm.

After a lapse of a predetermined time from the start of aeration, a sample was collected from the sludge suspension and centrifuged at 9000 G for 10 minutes to obtain supernatant. The concentrations of ammonium nitrogen, nitrite nitrogen, and nitrate nitrogen in the supernatant were measured in the same manner as in Example 1.

Figure 3:
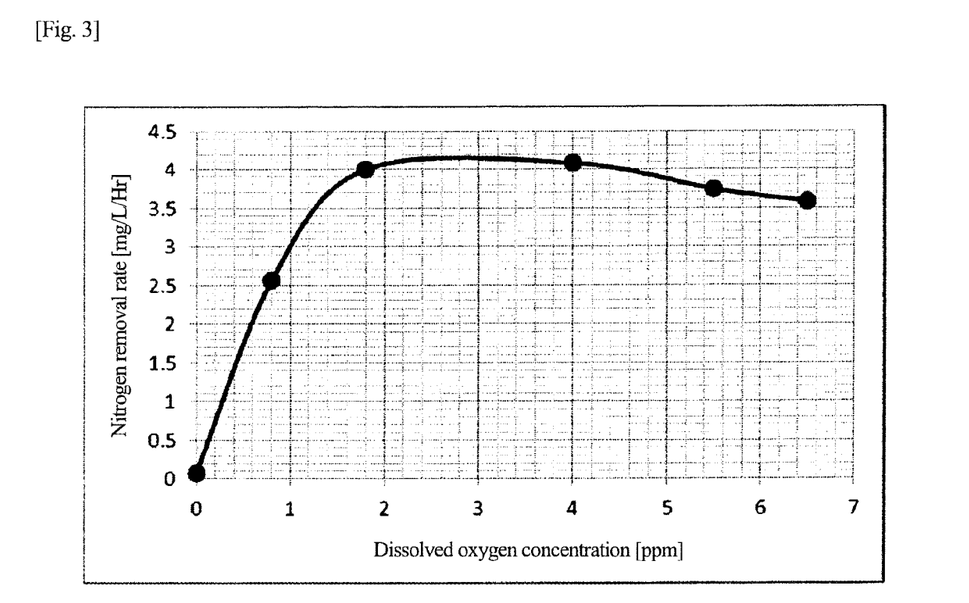
FIG. 3 is a graph showing the relationship between a dissolved oxygen concentration and a nitrogen removal rate of Example 5.

A nitrogen removal rate was calculated from a temporal change in T-N (total nitrogen), and the obtained result is shown in FIG. 3.

This result revealed that when the concentration of dissolved oxygen in the water system was higher than 0 ppm, a high nitrogen removal rate was achieved and nitrogen could be efficiently removed from the system. In particular, it was revealed that from the viewpoint of nitrogen removal rate, the concentration of dissolved oxygen in the water system was preferably 1.5 ppm or more, more preferably 2 ppm or more. Further, the nitrogen removal rate was stagnated, which revealed that the concentration of dissolved oxygen in the water system was preferably 4 ppm or less, more preferably 2.5 ppm or less.

Comparative Example 1

According to the description in Example 1, a sludge suspension using the simulated wastewater was prepared. Then, the sludge suspension was aerated without adding a biodegradable resin such as PHBH granules while the concentrations of ammonium nitrogen, nitrite nitrogen, and nitrate nitrogen were measured with time. The other experimental conditions and analytical conditions were the same as those in the method described in Example 1. The results are shown by dash lines in FIG. 1.

Further, a nitrogen removal rate was calculated from a temporal change in T-N (total nitrogen). The obtained result is shown in FIG. 2.

This result revealed that when no biodegradable resin was added, the nitrogen removal rate was low, the concentration of nitrogen in the system was not sufficiently reduced even after a lapse of time, and nitrogen could not be efficiently removed from the system.

Comparative Example 2

In accordance with the description in Example 1, a sludge suspension using the simulated wastewater was prepared. Then, acetic acid was added to the sludge suspension instead of the PHBH granules. An experiment was performed using the thus obtained sludge suspension. The ratio (weight ratio) of the amount of dissolved carbon to the amount of dissolved nitrogen in the acetic acid-added sludge suspension was 11.

The other experimental conditions and analytical conditions were the same as those in the method described in Example 1.

The concentration of ammonium nitrogen contained in the supernatant was rapidly reduced in spite of the fact that the concentration of N—NOx was not increased. This revealed that ammonium nitrogen was rapidly taken up by bacteria cells, and a nitrification reaction did not occur. Thereafter, the concentration of ammonium nitrogen in the system was increased. As a result, nitrogen in the system could not be removed. From the fact that the concentration of N—NOx was not increased, it may be considered that a nitrification reaction did not occur. Further, the reason why the concentration of ammonium nitrogen was increased is considered to be that nitrogen ammonia was eluted from bacteria cells.

Example 6

Examination of Nitrification Rate of PHBH Granules-added System

First, 1 mM of citric acid, 2 mM of potassium dihydrogen phosphate, 0.5 mM of magnesium sulfate heptahydrate, 20 mM of sodium chloride, 0.02 mM of calcium chloride dihydrate, 0.01 mM of zinc sulfate heptahydrate, 0.03 mM of iron sulfate (II) heptahydrate, 0.01 mM of copper sulfate pentahydrate, 5 mg/L of EDTA, 9 mM, 18 mM, 44 mM, or 86 mM of ammonium chloride were dissolved in distilled water to obtain a solution. The solution was adjusted to pH 8.5 by adding a 30% sodium hydroxide solution to obtain simulated wastewater. The simulated wastewater was used in the following experiment. It is to be noted that the ratio (weight ratio) of the amount of dissolved carbon to the amount of dissolved nitrogen in the simulated wastewater was from 0.06 to 0.59.

Then, a sludge suspension was obtained in the same manner as in Example 1, and the concentration of ammonium nitrogen contained in the supernatant of the sludge suspension was measured. The results are shown in Table 1.

Then, 3% of PHBH granules (purity: 99 wt % or more, specific gravity: 1.1 g/cm$^3$) were added to the sludge suspension, and the sludge suspension was aerated at 30±2° C. At this time, the aeration was performed while the pH of the sludge suspension was adjusted to 8 to 8.5 with the use of a 30% sodium hydroxide solution, and an air flow rate was adjusted so that the concentration of dissolved oxygen (DO) in the sludge suspension was 5 ppm or more.

After a lapse of a predetermined time from the start of aeration, a sample was taken from the sludge suspension and centrifuged at 9000 G for 10 minutes to obtain supernatant. The concentration of ammonium nitrogen in the supernatant was measured. It is to be noted that the concentration of ammonium nitrogen (N—NH$_3$) was measured using DR6000 and a corresponding reagent (TNT832) manufactured by HACH. A nitrification rate was calculated from a temporal change in the concentration of N—NH$_3$. The obtained results are shown in Table 1.

Comparative Example 3

Examination of Nitrification Rate of Biodegradable Resin-free System

An experiment was performed in the same manner as in Example 6 except that the concentration of ammonium chloride in the simulated wastewater was changed to 9 mM, 18 mM, 35 mM, 44 mM, or 86 mM, and PHBH granules were not added. A nitrification rate was calculated. The obtained results are shown in Table 1.

TABLE 1

| Initial ammonium chloride concentration [mM] | Initial ammonium nitrogen concentration [mg/L] | Dissolve carbon/ dissolved nitrogen (weight ratio) | Comparative Example 3 Nitrification rate of PHBH-free system [mg/L/Hr] | Example 6 Nitrification rate of PHBH-added system [mg/L/Hr] |
|---|---|---|---|---|
| 0 | 0 | — | 0 | 0 |
| 9 | 126 | 0.59 | 1.15 | 2.21 |
| 18 | 251 | 0.29 | 2.4 | 3.81 |
| 35 | 488 | 0.15 | 3.84 | — |
| 44 | 612 | 0.12 | 4.13 | 7.16 |
| 86 | 1206 | 0.06 | 6.69 | 10.21 |

The results of Example 6 and Comparative Example 3 revealed that the nitrification rate of the PHBH-added system was about 1.5 to 1.9 times higher than that of the PHBH-free system, and nitrification of ammonium nitrogen was promoted by adding PHBH. Further, it was revealed that even when water contained a high concentration of ammonium nitrogen, a nitrification reaction was promoted by adding PHBH.

Figure 4:
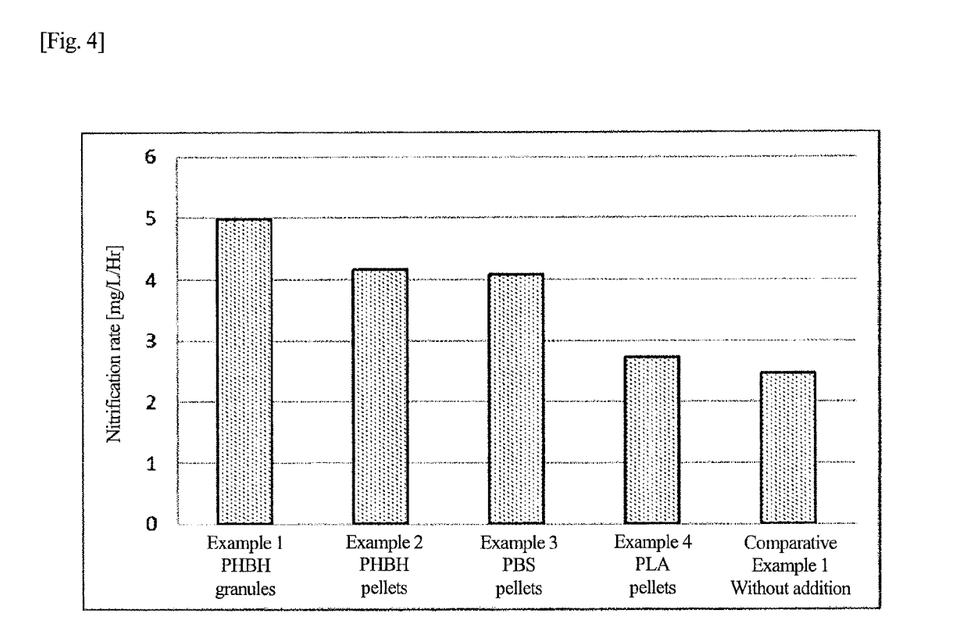
FIG. 4 is a graph showing the nitrification rates of systems of Examples 1 to 4 and Comparative Example 1.

Further, nitrification rates of Examples 1 to 4 and Comparative Example 1 were calculated in the same manner as in Example 6. The obtained results are shown in FIG. 4. The results reveal that a nitrification reaction in biological treatment of water containing ammonium nitrogen is promoted by adding the PHBH granules, the PHBH pellets, the PBS pellets, or the PLA pellets. Further, as described above, in Comparative Example 2 in which acetic acid was added instead of a biodegradable resin, ammonium nitrogen was rapidly taken up by bacteria cells so that a nitrification reaction did not occur.

The invention claimed is:

1. A nitrogen removal method, comprising:
   adding a solid material containing a biodegradable resin as a hydrogen donor to one water system in which bacteria cells having an ability to decompose a biodegradable resin, bacteria cells having nitrification capabilities, and bacteria cells having denitrification capabilities live together and
   conducting a nitrification reaction and a denitrification reaction simultaneously in the one water system in the presence of the biodegradable resin without separately providing an anaerobic system and an aerobic system.

2. The nitrogen removal method according to claim 1, wherein the water system has a dissolved oxygen concentration of at least 1.5 ppm.

3. The nitrogen removal method according to claim 1, wherein the biodegradable resin is a biodegradable polyester.

4. The nitrogen removal method according to claim 3, wherein the biodegradable polyester is a biodegradable aliphatic polyester.

5. The nitrogen removal method according to claim 4, wherein the biodegradable aliphatic polyester is a poly-3-hydroxyalkanoate.

6. The nitrogen removal method according to claim 5, wherein the poly-3-hydroxyalkanoate is a poly-3-hydroxybutyrate homopolymer or copolymer.

7. The nitrogen removal method according to claim 1, wherein the water system has a weight ratio of an amount of dissolved carbon to an amount of dissolved nitrogen of 10 or less.

8. The method of claim 1, wherein the biodegradable resin added to the system is in a form of pellets or particles.

9. A water treatment method, comprising:
adding the nitrification-reaction promoting agent for water treatment according to claim 8 to one water system in which bacterial cells having an ability to decompose a biodegradable resin, bacteria cells having nitrification capabilities, and bacteria cells having denitrification capabilities live together and
conducting a nitrification reaction and a denitrification reaction simultaneously in the one water system in the presence of the biodegradable resin without separately providing an anaerobic system and an aerobic system.

10. The water treatment method according to claim 9, wherein the one water system has a dissolved oxygen concentration of 1.5 ppm or more.

11. The water treatment method according to claim 9, wherein the one water system has a weight ratio of an amount of dissolved carbon and an amount of dissolved nitrogen of 10 or less.

12. The method of claim 9, wherein the biodegradable resin added to the system is in a form of pellets or particles.

* * * * *